US 6,412,603 B1

(12) United States Patent
Nervig et al.

(10) Patent No.: US 6,412,603 B1
(45) Date of Patent: Jul. 2, 2002

(54) AUTOMATED GALLEY CART STORAGE SYSTEM

(75) Inventors: Steven N. Nervig, Kent; George D. Sherotsky, Renton; Thomas E. Wittmann, Seattle, all of WA (US)

(73) Assignee: The Boeing Company, Seattle, WA (US)

( * ) Notice: Subject to any disclaimer, the term of this patent is extended or adjusted under 35 U.S.C. 154(b) by 58 days.

(21) Appl. No.: 09/620,847

(22) Filed: Jul. 21, 2000

(51) Int. Cl.[7] .................................................. B66F 11/00
(52) U.S. Cl. .................................... 187/267; 244/118.1
(58) Field of Search ............................. 414/228, 331.01, 414/331.04, 608, 785; 312/312, 319.5, 319.8; 244/118.1; 187/214, 267, 268

(56) References Cited

U.S. PATENT DOCUMENTS

| 3,517,899 | A |   | 6/1970  | Vernon |           |
|-----------|---|---|---------|--------|-----------|
| 3,615,003 | A |   | 10/1971 | Rust   |           |
| 3,999,630 | A |   | 12/1976 | McPhee |           |
| RE32,176  | E |   | 6/1986  | Vernon |           |
| 4,653,707 | A |   | 3/1987  | Hamilton et al. |  |
| 4,660,787 | A |   | 4/1987  | Sprenger et al. |  |
| 5,036,951 | A | * | 8/1991  | Frangos | ........ 187/214 |
| 5,074,496 | A |   | 12/1991 | Rezag et al. |    |
| 5,314,143 | A |   | 5/1994  | Luria  |           |
| 5,322,244 | A |   | 6/1994  | Dallmann et al. | |
| 5,413,292 | A | * | 5/1995  | Luria  | ........ 244/118.1 |
| 5,474,260 | A |   | 12/1995 | Schwertfeger et al. | |
| 5,496,000 | A |   | 3/1996  | Mueller |          |
| 5,542,626 | A |   | 8/1996  | Beuck et al. |    |
| 5,626,208 | A | * | 5/1997  | Sprague et al. | ........ 187/267 |
| 5,727,654 | A |   | 3/1998  | Roessner et al. | |
| 5,759,005 | A | * | 6/1998  | Roessner et al. | ........ 414/280 |
| 6,059,229 | A |   | 5/2000  | Luria  |           |
| 6,241,048 | B1 | * | 6/2001 | Heilmann | ........ 414/228 |
| 6,305,643 | B1 | * | 10/2001 | Sankrithi | ........ 244/118.1 |
| 6,340,136 | B1 | * | 1/2002 | Luria  | ........ 244/118.1 |

FOREIGN PATENT DOCUMENTS

DE            42 08 438 A1      9/1993

* cited by examiner

Primary Examiner—James W. Keenan
(74) Attorney, Agent, or Firm—Christensen O'Connor Johnson Kindness PLLC

(57) ABSTRACT

A galley cart storage system is provided for use with rectangular galley carts (22), (22') each being supported by a number of wheels. The storage system includes a rectangular upright enclosure (12) and a lift assembly (14) located within the enclosure (12) to move one or more galley carts vertically, in a stacked configuration. The enclosure (12) includes upright corner posts (16) that aid vertical movement of a galley cart. The lift assembly (14) includes a motor (30), a drive screw (32), and a lifting bracket (34). The drive screw (32) is located along one side of the enclosure and is oriented vertically. The drive screw (32) connects to the motor (30) such that rotary motion of the motor (30) causes like rotation of the drive screw (32). The lifting bracket (34) is also located adjacent to the drive screw (32) and is threaded thereon. The lifting bracket (34) includes a cart interface member adapted to engage the lower end of a galley cart. Activation of the motor (30) causes rotation of the drive screw (32) and corresponding movement of the lifting bracket (34) along the drive screw (32), thereby causing the galley cart to move vertically within the enclosure (12), guided along the corner posts (16).

18 Claims, 4 Drawing Sheets

AUTOMATED GALLEY CART STORAGE SYSTEM

FIELD OF THE INVENTION

The present invention relates to cart storage systems used in confined spaces; and more particularly, to cart storage systems for use in on-board galleys of commercial jet aircraft or other vehicles.

BACKGROUND OF THE INVENTION

Large commercial aircraft have galley areas that can occupy a significant area of passenger-level floor space. While large galley area to support meal service is generally desirable from a passenger perspective, most airline operators would prefer to fill such area with revenue-generating passenger seats. This is further exacerbated in that known galley systems store food carts at floor level only and use the space above the carts as workcounters and storage compartments. For large aircraft with long range flight capabilities and large numbers of passengers, there is typically more storage and work space available over the carts than is required. This results in the galley space not being used to its full potential. Thus, a need exists for a more efficient aircraft galley in which the optimum use of volumetric space is made. The present invention is directed to fulfilling this need and others as described below.

SUMMARY OF THE INVENTION

In accordance aspects of the present invention, a galley cart storage system is provided for use with conventional, wheeled galley carts. The storage system includes a generally rectangular upright enclosure and a lift assembly. The present invention uses the lift assembly to stack galley carts within the enclosure in order to optimize the galley volume and floor space. The enclosure has a rigid frame formed of upright corner posts. The enclosure further includes a front opening sized to accept a galley cart, a back side, and two sides sized at least as large as the depth of a galley cart. The enclosure is sized to accommodate at least two galley carts in at least a single vertical stack.

The lift assembly includes a motor and drive screw each located either adjacent to or within the enclosure and a lifting bracket connected to the drive screw. The drive screw is oriented vertically and is connected to the motor such that rotary motion of the motor causes like rotation of the drive screw. The lifting bracket is threadingly connected to the drive screw. The lifting bracket includes a cart interface member adapted to engage the lower end of a first galley cart. During use, activation of the motor causes rotation of the drive screw and corresponding movement of the lifting bracket along the drive screw. This causes the cart interface member to lift the galley cart vertically within the enclosure.

In accordance with other aspects of this invention, various alternative arrangements are described. In one embodiment, the lifting bracket includes a triangular plate that has a lower edge shelf adapted to engage the lower edge of the galley cart. In another embodiment, the lifting bracket includes an L-shaped bracket. In yet another embodiment, the lifting bracket is formed as a lateral arm. Further alternatives are provided in which dual adjacent stacks of carts may be housed within the enclosure.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a galley cart storage system 10 having an upright enclosure 12 and a lift assembly 14 to lift a first galley cart high enough for an attendant to insert a second galley cart thereunder. The present invention thus reduces the amount of floor area required to store galley carts, or conversely increases the number of carts stored per galley volume. The present invention is described herein as applied to the galley of an aircraft. However, it is to be understood that the present invention may be used on other vehicle, such as trains, or even at stationary locations.

Figure 1:
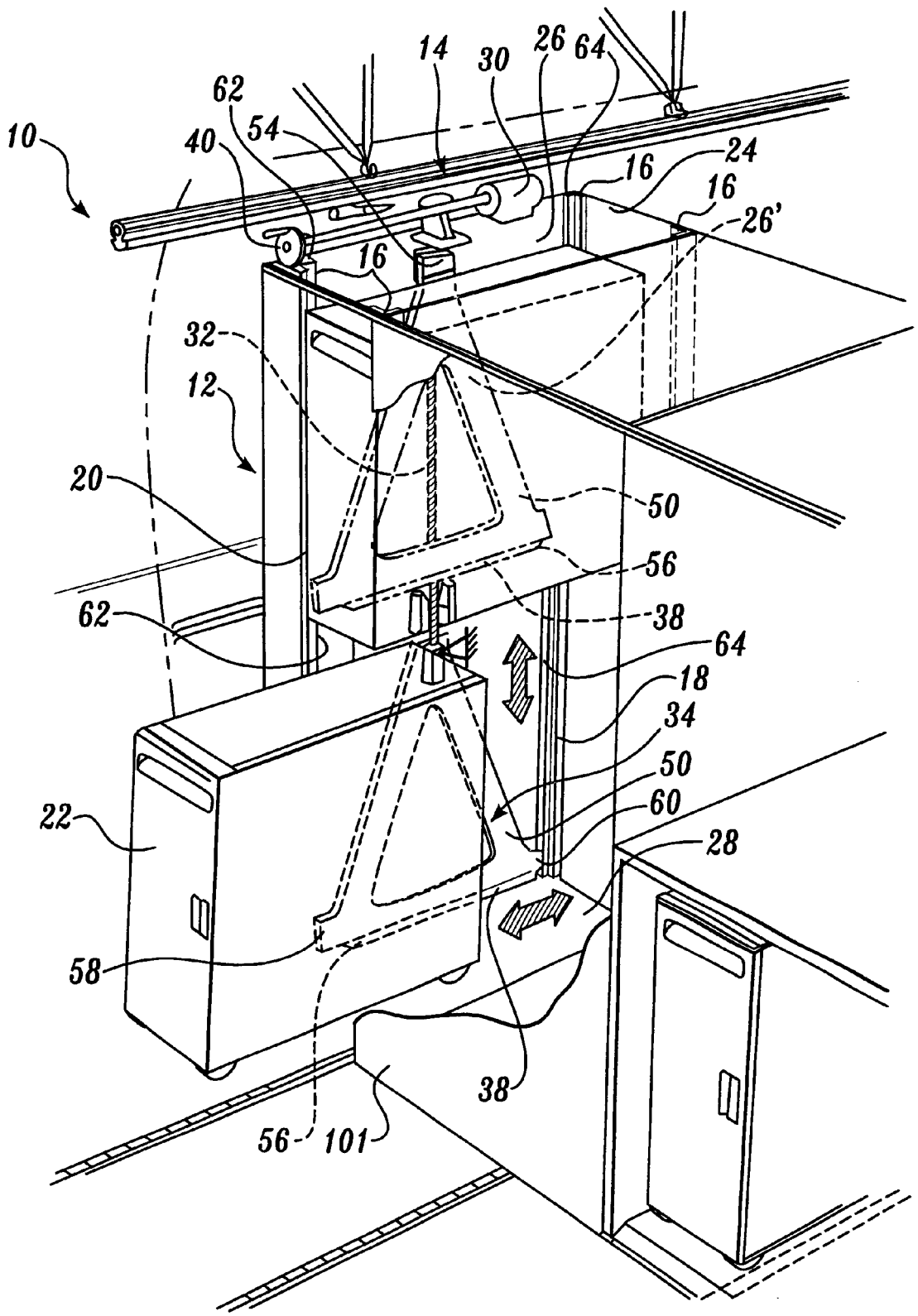
FIG. 1 is a perspective view of a first embodiment of an automated galley cart storage system formed in accordance with the present invention.
Figure 2:
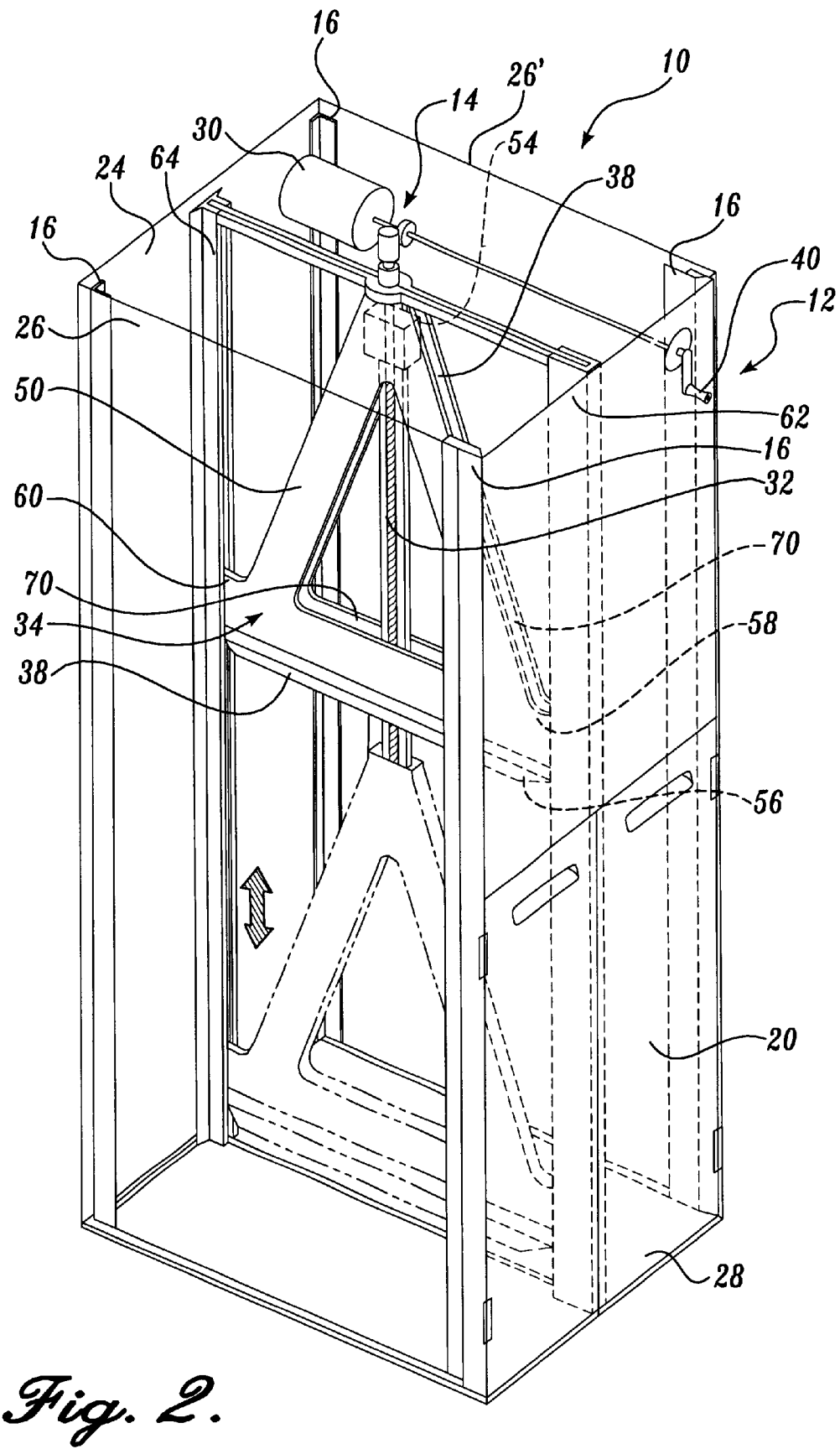
FIG. 2 is a perspective view of a second embodiment of an automated galley cart storage system formed in accordance with the present invention.
Figure 3:
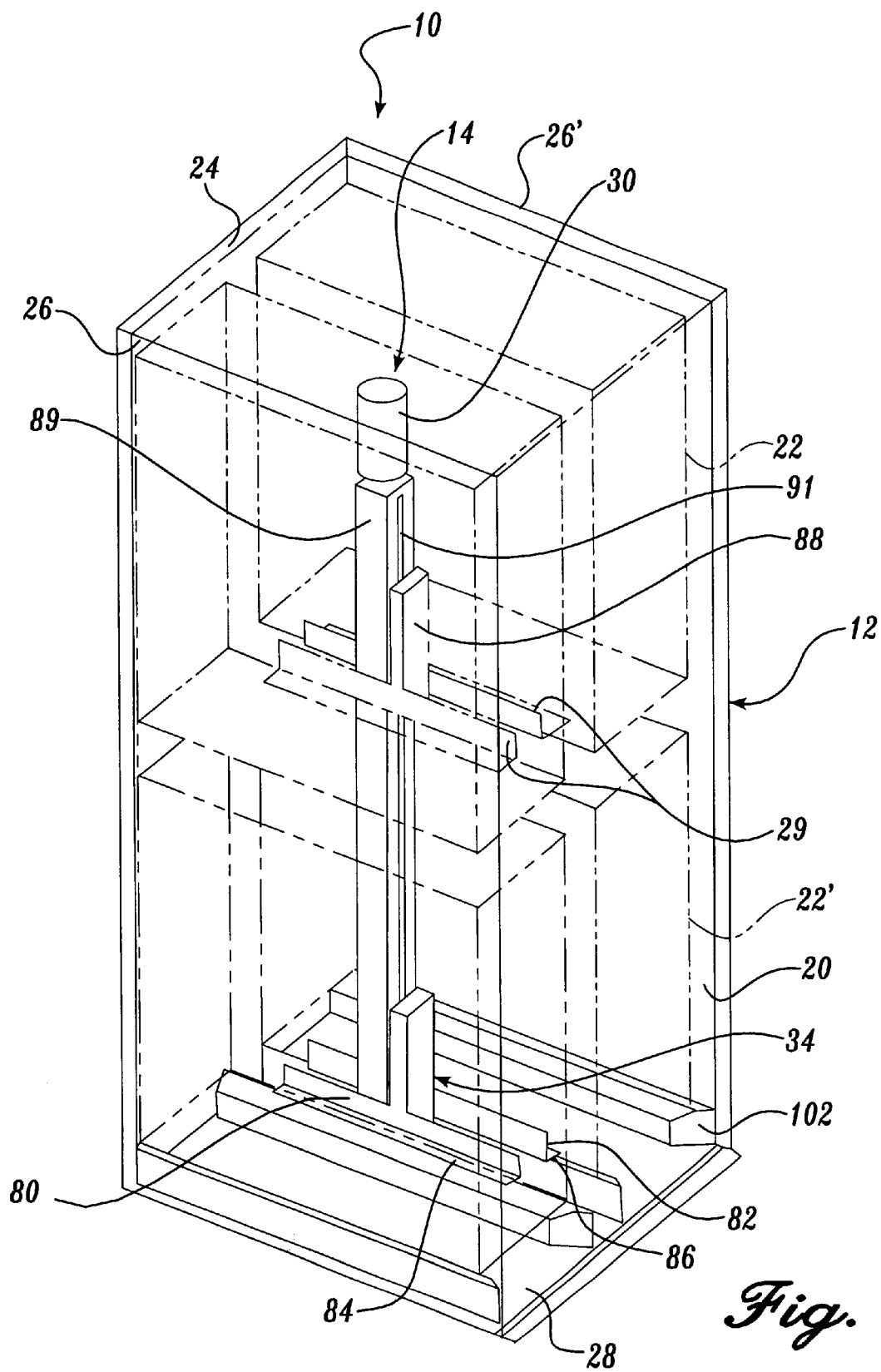
FIG. 3 is a perspective view of a third embodiment of an automated galley cart storage system formed in accordance with the present invention.
Figure 4:
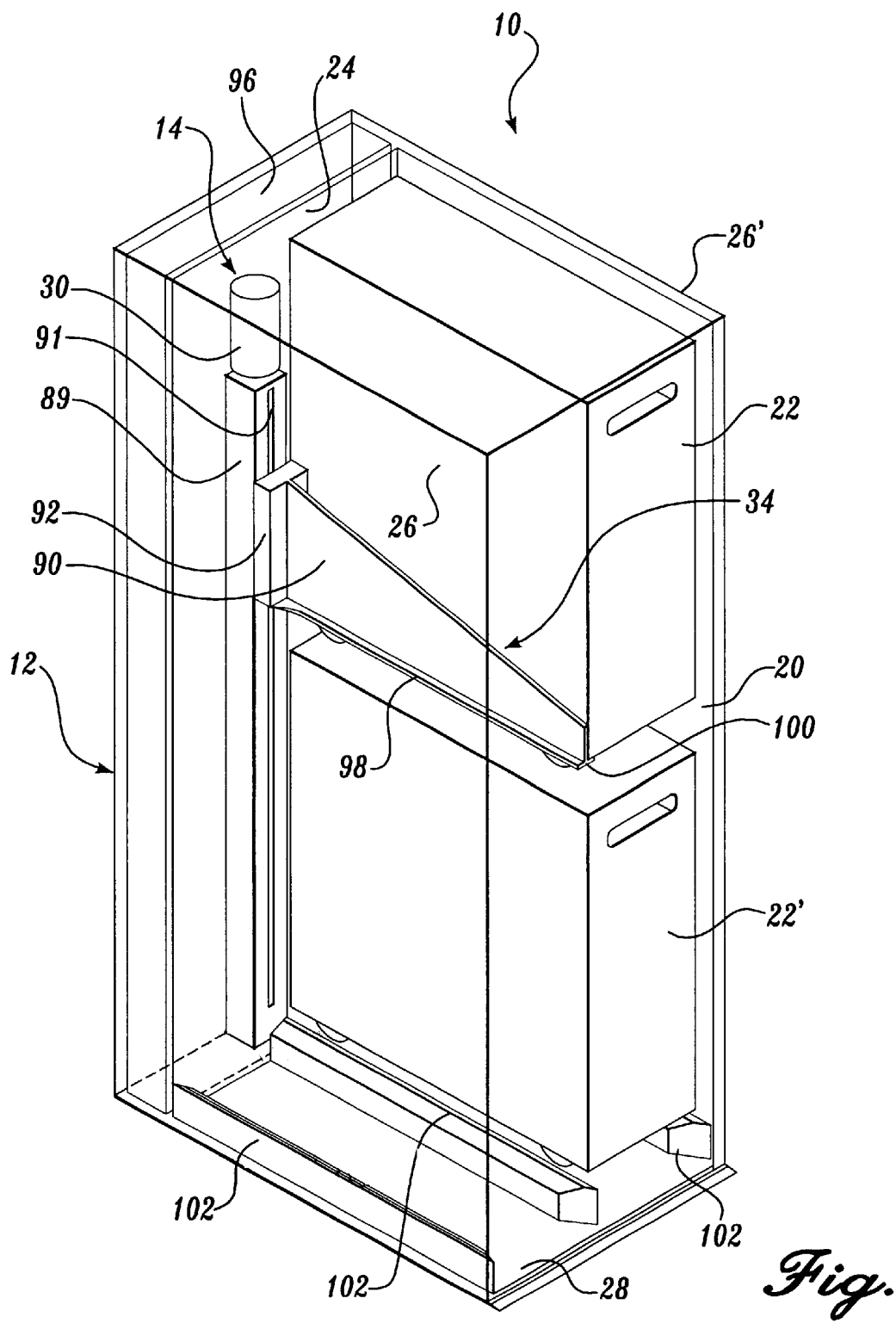
FIG. 4 is a perspective view of a fourth embodiment of an automated galley cart storage system formed in accordance with the present invention.

Four embodiments of the present invention are provided in the accompanying drawings. As will be appreciated, numerous other additional arrangements of the present invention are possible. FIG. 1 illustrates a first embodiment of an automated galley cart storage system having an enclosure within which galley carts are positioned in a single upright stack. A lifting mechanism, shown in FIG. 1 as item 34, is located in the upright enclosure, along one side. FIG. 2 is similar to the first embodiment with the addition of a second upright column in which carts may be stacked. FIG. 3 presents an alternative lifting mechanism for use in a dual column stacking arrangement. FIG. 4 illustrates a fourth embodiment of an automated galley cart storage system having dual cart stacks and a lifting mechanism located along the back side of the enclosure.

Referring to FIG. 1, the enclosure 12 is formed from a rectangular rigid frame defined by upright corner posts 16. In a preferred embodiment, the enclosure corner posts include a low friction material or device such as Teflon™ (a polytetrafluoroethylene coating or the like), rollers, or bearings. By reducing the friction, the cart is made to slide more easily within the enclosure. The enclosure includes a front opening 20 sized to accept a conventional galley cart 22, a back side 24 opposite the front opening, and two opposed side planes 26, 26' sized as large as the depth of a galley cart. As shown in FIG. 1, the enclosure is tall enough to accommodate at least two galley carts in a vertical stack. The enclosure has a lower floor 28 upon which a galley cart may be rolled into and out of the enclosure via the front opening 20.

The lift assembly 14 includes an electric motor 30 located adjacent to or slightly within the enclosure 12, generally above the enclosure near one of its sides. In the embodiment of FIG. 1, the motor 30 is positioned near side 26 and slightly above the enclosure frame. The motor is connected to and supported by surrounding structure, e.g., stringers, trusses, ribs, etc. A drive screw 32 is located at the same enclosure side 26, though, below the motor 30. The drive screw 32 is oriented vertically and connected to the motor such that rotary output motion from the motor causes axial rotation of the drive screw, e.g., in worm-wheel fashion or other gear configuration.

A lifting bracket 34 is positioned within the enclosure and threadingly connected to the drive screw 32. The lifting bracket 34 includes a cart interface member adapted to engage the lower end of a galley cart 22. In one embodiment, the cart interface member is a rigid lower shelf 38 that engages the lower edge of a galley cart. The lifting bracket 34 moves between a lower first position and an elevated second position. In one embodiment, a hand crank 40 is connected to the drive screw 32 to allow an attendant to manually operate the lift assembly 14, if the motor 30 should become inoperative.

During use, activation of the motor 30 causes rotation of the drive screw 32 and corresponding vertical movement of the lifting bracket 34 along the drive screw 32. In moving from the lower position to the upper position, the cart interface member catches the bottom edge of a galley cart and lifts the cart within the enclosure as the bracket 34 translates up the drive screw 32. Once the lifting bracket 34 reaches its elevated second position, there is sufficient space below the lifted galley cart for an attendant to store a second galley cart 22' therebelow. In this way, the galley space is maximize by reducing overcounter work and storage space in favor of additional cart storage space. The galley cart 22 is held aloft until the motor 30 is operated in reverse, at which time the lifting bracket 34 moves down the drive screw 32 and correspondingly lowers the galley cart 22 within the enclosure 12.

Still referring to FIG. 1, the embodiment shown uses a lifting bracket shaped as a triangular plate 50 with a lateral lower edge. The triangular plate 50 is connected to a collar 54 that engages the drive screw 32. The lower end of the drive screw is braced to surrounding structure. The cart interface member is a rigid lower shelf 56 formed along the lateral lower edge of the triangular plate 50. As shown, the triangular plate 50 includes first and second corners 58, 60 that are oriented in a fore-and-aft plane of the enclosure side, beneath the motor 30. The lateral lower edge of the triangular plate 50 extends between these first and second corners 58, 60. In this arrangement, the enclosure 12 preferably includes first and second upright plate guides 62, 64 positioned at the frame corner posts 16 that define that side of the enclosure. The plate guides 62, 64 include a channel within which the corners 58, 60 of the triangular plate translate during use. The plate first corner 58 is guided by the first upright plate guide 62. The plate second corner 60 is guided by the second upright plate guide 64.

Referring to FIG. 2, a second embodiment is shown in which the enclosure is sized to accommodate dual adjacent stacks of carts. The drive screw 32 is positioned between the dual stacks. The lower end of the drive screw is not supported. The lifting bracket 34 includes a second triangular plate 70 similar to the first plate 50. Both plates 50, 70 include a rigid lower shelf to engage the lower end edge of a galley cart. The first and second triangular plates 50, 70 are attached to a single connection collar 74. The plates 50, 70 are located on opposite sides of the collar 74 and the drive screw 32, and are oriented in opposite directions. The upright plate guides 62, 64 are positioned within the enclosure at its front and back sides. The guides are modified to accommodate and guide the lower end corners of both plates during use. As will be appreciated from viewing FIG. 2, operation of the motor causes both plates 50, 70 to translate vertically. Therefore, two carts should be used, one on each plate, in order to stabilize the lift assembly.

Referring to FIG. 3, a third embodiment is provided in which dual adjacent cart stacks are moved by a pair of elongate L-shaped brackets 80, 82 each having a rigid lower shelf 84, 86 to engage the lower edge of first and second galley carts. As with the second embodiment, the drive screw 32 is position between the dual stacks. The first and second L-shaped brackets 80, 82 are attached to a single connection collar 88 that threadingly engages the drive screw 32. The brackets 80, 82 are located on opposite sides of the collar 88 and the drive screw 32, and are oriented in opposite directions. Upright plate guides (not shown in FIG. 3) may be optionally used along the enclosure front and back sides to stabilize and guide the brackets during use. The embodiment of FIG. 3 further includes a drive screw housing 89 with a slot 91. The drive screw 32 is located within the housing 89. The lower end of the drive screw may be secured to the housing or the enclosure floor. The collar 88 connects to the drive screw through the slot 91.

Referring to FIG. 4, a fourth embodiment of the present invention is provided having a lateral arm 90. The arm 90 is connected to a connection collar 92 that engages the drive screw 32. The drive screw 32 is located along the enclosure back wall 24 with the arm 90 extending longitudinally forward within the enclosure 12. The motor 30 is located behind the enclosure 12 in a rear compartment 96. The lateral arm 90 includes first and second rigid lower shelves 98, 100 that extend in opposite lateral directions from a lower region of the arm 90. Each shelf 98, 100 is adapted to engage the lower edge of a galley cart. The fourth embodiment is similar to the third embodiment in the use of a secured drive screw lower end and a housing 89 with a slot 91. The collar 92 connects to the drive screw through the slot 91.

As will be appreciated from a reading of the above, the present invention galley cart storage system optimizes airplane galley volume with little or no impact on normal galley operations. The system further improves the efficiency of the galley by eliminating unused over-cart work and storage space. If used on a commercial aircraft, the present invention may have a beneficial impact on revenue passenger seating if seats are used to fill the relieved space.

While the preferred embodiment of the invention has been illustrated and described, it will be appreciated that various changes can be made therein without departing from the spirit and scope of the invention. For example, as stated above the present invention may be used on fixed and ground based storage system. In addition, the enclosure may be fitted with a sliding door and a cut off switch in electric communication with the door, the lift assembly being operative only when the door is closed. See for example, door 101 in FIG. 1. Various guide rails 102 may be provided along the enclosure floor 28 to help position the carts. See, for example, the embodiments of FIGS. 3 and 4.

The embodiments of the invention in which an exclusive property or privilege is claimed are defined as follows:

1. A galley cart storage system for use with rectangular galley carts having a lower end supported by a number of wheels, the storage system comprising:

(a) a rectangular upright enclosure having a rigid frame formed of upright corner posts; the enclosure further including a front opening sized to accept a galley cart, a back side, and two sides; the enclosure being sized to accommodate at least two galley carts in at least a single vertical stack; and (b) a lift assembly comprising:

(i) a motor located adjacent the enclosure;

(ii) a drive screw located in the enclosure and oriented vertically, the drive screw being connected to the motor such that rotary motion of the motor causes like rotation of the drive screw; and (iii) a lifting bracket within the enclosure and threadingly connected to the drive screw; the lifting bracket including a cart interface member adapted to engage the lower end of a first galley cart;

wherein activation of the motor causes rotation of the drive screw and corresponding movement of the lifting bracket along the drive screw, a galley cart moving vertically within the enclosure;

wherein the lifting bracket is shaped as a triangular plate with a lateral lower edge, the cart interface member being a first rigid lower shelf formed along the lateral lower edge, the lateral lower edge extending between first and second corners of the triangular plate, the triangular plate being positioned within the enclosure in a longitudinal orientation.

2. The galley cart storage system according to claim 1, wherein the lift assembly further includes a hand crank connected to the drive screw to allow an operator to manually operate the lift assembly.

3. The galley cart storage system according to claim 1, wherein the upright corner posts include at least one of a polytetrafluoroethylene coating, roller guides, and bearings.

4. The galley cart storage system according to claim 1, wherein the enclosure includes first and second upright plate guides positioned generally in the longitudinal plane of the triangular plate, the plate first corner being guided by the first upright plate guide, the plate second corner being guided by the second upright plate guide.

5. The galley cart storage system according to claim 4, wherein the first and second upright plate guides include a channel within which the first and second ends of the triangular plate translate during use.

6. A galley cart storage system for use with rectangular galley carts having a lower end supported by a number of wheels, the storage system comprising:

(a) a rectangular upright enclosure having a rigid frame formed of upright corner posts; the enclosure further including a front opening sized to accept a galley cart, a back side, and two sides; the enclosure being sized to accommodate at least two galley carts in at least a single vertical stack; and (b) a lift assembly comprising:
(i) a motor located adjacent the enclosure;
(ii) a drive screw located in the enclosure and oriented vertically, the drive screw being connected to the motor such that rotary motion of the motor causes like rotation of the drive screw; and
(iii) a lifting bracket within the enclosure and threadingly connected to the drive screw; the lifting bracket including a cart interface member adapted to engage the lower end of a first galley cart;

wherein activation of the motor causes rotation of the drive screw and corresponding movement of the lifting bracket along the drive screw, a galley cart moving vertically within the enclosure;

wherein the enclosure is sized to accommodate dual adjacent stacks of carts, the drive screw being positioned between the dual stacks and the cart interface member including a first rigid lower shelf adapted to engage the lower end of a first galley cart and a second rigid lower shelf adapted to engage the lower end of a second galley cart; the first and second rigid lower shelves being located on opposite sides of the drive screw and oriented in opposite directions.

7. The galley cart storage system according to claim 6, wherein the lifting bracket is provided as a pair of triangular plates each having a lateral lower edge in which the first and second rigid lower shelves are formed, each lateral lower edge extending between first and second corners of each triangular plate.

8. The galley cart storage system according to claim 7, wherein the enclosure includes a first upright plate guide positioned within the enclosure at its front side and a second upright plate guide positioned within the enclosure at its back side, the first corner of each triangular plate being guided by the first upright plate guide, the second corner of each triangular plate being guided by the second upright plate guide.

9. The galley cart storage system according to claim 6, wherein the lift assembly further includes a handcrank connected to the drive screw to allow an operator to manually operate the lift assembly.

10. The galley cart storage system according to claim 6, wherein the upright corner posts include at least one of a polytetrafluoroethylene coating, roller guides, and bearings.

11. A galley cart storage system for use with rectangular galley carts having a lower end supported by a number of wheels, the storage system comprising:

(a) a rectangular upright enclosure having a rigid frame formed of upright corner posts; the enclosure further including a front opening sized to accept a galley cart, a back side, and two sides; the enclosure being sized to accommodate at least two galley carts in at least a single vertical stack; and (b) a lift assembly comprising:
(i) a motor located adjacent the enclosure;
(ii) a drive screw located in the enclosure and oriented vertically, the drive screw being connected to the motor such that rotary motion of the motor causes like rotation of the drive screw; and
(iii) a lifting bracket within the enclosure and threadingly connected to the drive screw; the lifting bracket including a cart interface member adapted to engage the lower end of a first galley cart;

wherein activation of the motor causes rotation of the drive screw and corresponding movement of the lifting bracket along the drive screw, a galley cart moving vertically within the enclosure;

wherein the enclosure is sized to accommodate dual adjacent stacks of carts, the drive screw being positioned between the dual stacks, the lifting bracket including a connection plate connected to the drive screw, the cart interface member including a pair of elongate L-shaped brackets each having a rigid lower shelf adapted to engage the lower edge of a galley cart, L-shaped brackets being attached to opposite sides of the connection plate and being oriented in opposite directions.

12. The galley cart storage system according to claim 11, wherein the lift assembly further includes a handcrank connected to the drive screw to allow an operator to manually operate the lift assembly.

13. The galley cart storage system according to claim 11, wherein the upright corner posts include at least one of a polytetrafluoroethylene coating, roller guides, and bearings.

14. A galley cart storage system for use with rectangular galley carts having a lower end supported by a number of wheels, the storage system comprising:

(a) a rectangular upright enclosure having a rigid frame formed of upright corner posts; the enclosure further including a front opening sized to accept a galley cart, a back side, and two sides; the enclosure being sized to accommodate at least two galley carts in at least a single vertical stack; and (b) a lift assembly comprising:
   (i) a motor located adjacent the enclosure;
   (ii) a drive screw located in the enclosure and oriented vertically, the drive screw being connected to the motor such that rotary motion of the motor causes like rotation of the drive screw; and
   (iii) a lifting bracket within the enclosure and threadingly connected to the drive screw; the lifting bracket including a cart interface member adapted to engage the lower end of a first galley cart;

wherein activation of the motor causes rotation of the drive screw and corresponding movement of the lifting bracket along the drive screw, a galley cart moving vertically within the enclosure;

wherein the enclosure is sized to accommodate dual stacks of carts, the drive screw being positioned at the rear of the enclosure, the lifting bracket including a connection plate connected to the drive screw, the cart interface member including an arm with first and second rigid lower shelves, each adapted to engage the lower edge of a galley cart, the first and second rigid lower shelves extending from opposite sides of the arm and oriented in opposite directions.

15. The galley cart storage system according to claim 14, wherein the stacked arrangement of at least two galley carts includes a lowermost galley cart; and wherein the enclosure front opening is positioned at the location of the lowermost galley cart, the enclosure further including a door located at the front opening.

16. The galley cart storage system according to claim 15, wherein the door is hingedly connected to one side of the enclosure.

17. The galley cart storage system according to claim 14, wherein the lift assembly further includes a handcrank connected to the drive screw to allow an operator to manually operate the lift assembly.

18. The galley cart storage system according to claim 14, wherein the upright corner posts include at least one of a polytetrafluoroethylene coating, roller guides, and bearings.

* * * * *